Aug. 13, 1946. W. E. SWIFT, JR Re 22,779
TORQUE AMPLIFIER
Original Filed Sept. 25, 1943
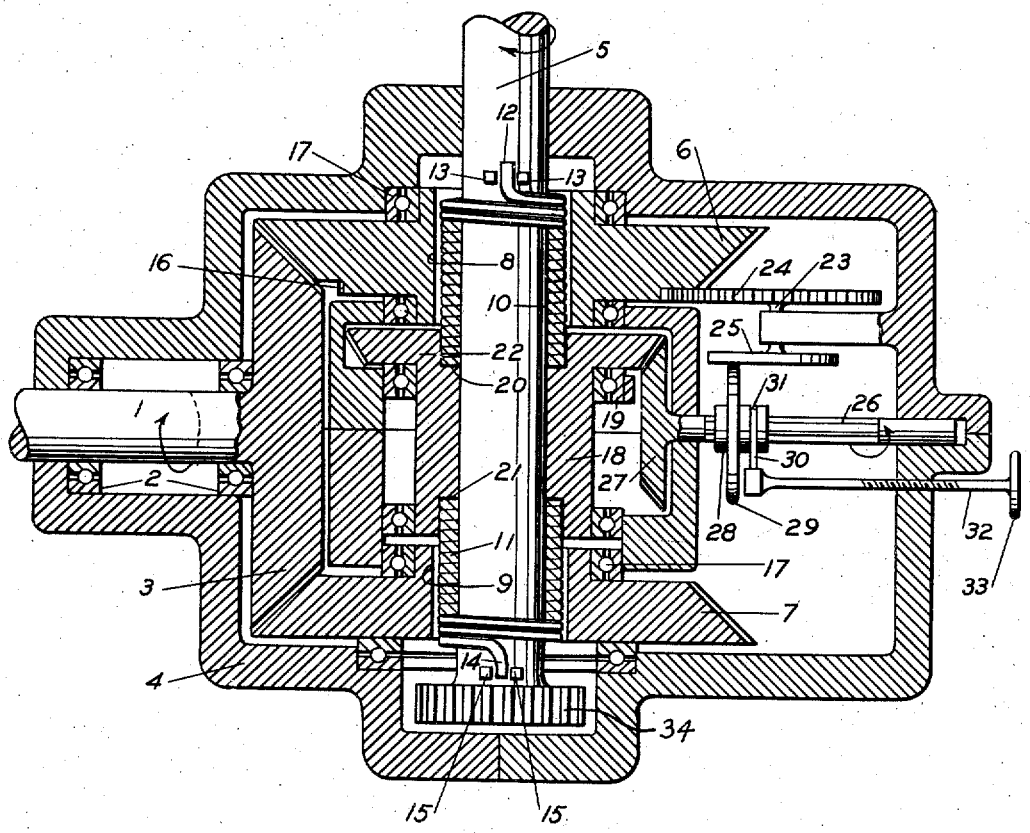
INVENTOR.
WILLARD E. SWIFT, JR.
BY
C. E. Herrstrom & W. E. Thibodeau
ATTORNEYS Reissued Aug. 13, 1946

Re. 22,779

UNITED STATES PATENT OFFICE 22,779

TORQUE AMPLIFIER

Willard E. Swift, Jr., Worcester, Mass.

Original No. 2,355,686, dated August 15, 1944, Serial No. 503,831, September 25, 1943. Application for reissue March 30, 1945, Serial No. 585,761

12 Claims. (Cl. 74—388)

(Granted under the act of March 3, 1883, as amended April 30, 1928; 370 O. G. 757)

The invention described herein may be manufactured and used by or for the Government for governmental purposes, without the payment to me of any royalty thereon.

The present invention has for its object a torque amplifier wherein a high power input may be controlled with respect to the output torque by means of a finely variable, manually operable speed reduction device. Another object of the invention is to provide such a device wherein the direction as well as the torque of the final driven shaft may be regulated.

The driving train to the driven shaft is established through a spring coiled around the shaft and at times loosely received in a drive gear. One end of the spring is anchored to the shaft and the other end frictionally received in a member which also loosely surrounds the shaft. This member is rotated from a variable speed device to drag the spring and, in one direction, expand it into contact with the gear. In this condition the spring is a driving connection between the gear and the shaft until the shaft exceeds the speed of the dragging member, whereupon the connection is interrupted. The connection is restored when the speed of the shaft becomes less than that of the dragging member. This cycle has a comparatively high frequency. Each cycle includes as one phase an impulse of driving force applied to the shaft. The rotation of the shaft is made substantially uniform by a device such as a flywheel or by operating parts having a flywheel effect.

A dual system of springs and driving gears is provided, the springs being mounted in such a manner that rotation of the dragging member in one direction leaves one of the springs idle. On reversal of the variable speed device and the dragging member actuated thereby, the condition of the springs is reversed. Thus, the driven shaft may be driven in either direction.

An illustrative embodiment of the invention is disclosed in the following description and in the accompanying drawing in which the single figure is a cross section of the device.

A drive shaft 1 driven from any suitable source and supported in bearings 2 carries a bevel gear 3. The bearings are mounted in a suitably shaped housing 4, and it will be understood that all bearings hereinafter mentioned are properly supported in the same housing.

A driven shaft 5 is mounted in the housing at right angles to the shaft 1. Two bevel gears or elements 6 and 7 are journaled in housing 4, coaxial with and about shaft 5, by antifriction bearings 17. These gears mesh with the gear 3 at diametrically opposite points. The gears are formed respectively with openings 8 and 9 around the shaft and receive coil springs 10 and 11 surrounding the shaft and having a clearance of .001 to .003 inch within their recesses 8 and 9. The springs are wound in the same direction but have opposite ends attached to the shaft. For example, the upper end of the spring 10 is bent lengthwise at 12 and received between a pair of lugs 13 on the shaft, while the lower end of the spring 11 is bent lengthwise at 14 and received between a pair of similar lugs 15. A spur gear 16 is formed with or attached to the gear 6 for a purpose that will presently appear. The gears 6 and 7 are journalled in and positioned by suitable bearings 17 mounted in the housing 4.

Between the springs 10 and 11 the shaft 5 is loosely surrounded by a sleeve or member 18 supported in suitable bearings 19. The ends of the sleeve are formed with cavities 20 and 21 receiving the inner ends of the springs 10 and 11 in frictional engagement with the walls of the cavity. For example, the diameter of each cavity may be .001 to .002 inch smaller than the outside diameter of the spring received therein. One end of the sleeve is formed with a gear 22 for a purpose that will presently appear.

A countershaft 23 is journalled in the housing 4 and carries the gear 24 meshing with the gear 16. A friction disk 25 is carried on the lower end of shaft 23.

Beneath the disk, a longitudinally splined shaft 26 is journalled in the housing and carries a gear 27 meshing with the gear 22. On the shaft 26 is splined a sleeve 28 formed with a disk 29 in peripheral engagement with the disk 25. A shifting fork 30 is received in a groove 31 formed in the sleeve 28 and has a threaded stem 32 screwed in housing 4 and fitted with an operating handle 33.

In the operation of the device, the gears 6 and 7 are in rotation simultaneously with the drive gear 3, and a light drive is transmitted through the gears 16, 24 and disks 25, 29 to the shaft 26 and gear 27. The speed of the latter varies with the distance of the disk 29 from the center of disk 25 and reverses when the disk 29 crosses the center of disk 25. The sleeve 18 is obviously driven from the gear 27 through the gear 22.

For purposes of description, it may be assumed that the parts are rotating in the direction indicated by the arrows, the shaft 5 being momentarily stationary. The frictional drag on the lower end of the spring 10 against the anchored end 12 expands the spring into engagement with the rotating gear 6. The gear 6 thus momentarily rotates the shaft 5 through the spring 10 as a connecting member and becomes disengaged from the spring when the speed of the shaft 5 exceeds that of the gear 22. At that time there is no longer a drag on the lower end of the spring. Consequently the spring contracts and interrupts the driving connection between the gear 6 and the shaft until the cycle is repeated when the speed of the shaft 5 drops below that of the gear 22. These cycles are of relatively high frequency and result in a substantially uniform speed of the shaft 5 as determined by the position of the sleeve 28. During this operation, the spring 11 is merely tightened on the shaft 5, so that the gear 7 merely overruns, and spring 11 slips in pocket 21.

On reverse rotation a similar overrunning occurs with respect to the gear 6. The spring 11, however, is expanded intermittently to establish a drive between the gear 7 and the shaft 5 in the manner already described in detail.

The mechanism is well suited for installation where the desideratum is the delicate and accurate control of a high power input rather than efficiency in transmitting power. As an example, the mechanism may be used to traverse a gun or rotate the turret of a combat tank. In such case the shaft 5 carries a take-off gear 34 that meshes with a ring gear carried by the body of the tank. Manual adjustment of the handle 33 regulates the high torque applied at the gear 3 and increased through the described gear train that determines the speed of the shaft 5.

While a specific embodiment of the invention has been illustrated and described, it is intended that various alterations in the details of construction may be made without departing from the invention as indicated by the scope of the appended claims.

What I claim is:

1. A torque amplifier comprising drive and driven shafts, a revoluble element coaxial with said driven shaft, means connecting said revoluble element to said drive shaft, a member journaled on said driven shaft, a coil spring surrounding said driven shaft and received loosely in said element; said spring having one end anchored to said driven shaft and the other end frictionally connected to said member, a variable speed device, means for driving the input of said variable speed device and means connecting the output side of said variable speed device to said member.

2. A torque amplifier comprising drive and driven shafts, a gear coaxial with said driven shaft and geared to said drive shaft, a member journaled on said driven shaft, a coil spring surrounding said driven shaft and received loosely in said gear, said spring having one end anchored to said driven shaft and the other end frictionally connected to said member, a variable speed device, means for driving the input of said variable speed device and means connecting the output side of said variable speed device to said member to rotate the same.

3. A torque amplifier comprising drive and driven shafts, a revoluble element independently journaled coaxial with said driven shaft, means connecting said revoluble element to said drive shaft, a gear journaled concentric of said driven shaft, a coil spring surrounding said driven shaft and received with .001'' to .003'' clearance in said element, said spring having one end anchored to said driven shaft and the other end frictionally fitting a counterbore in said gear, a variable speed device, means for driving the input of said variable speed device and means connecting the output side of said variable speed device to said gear to rotate the same.

4. A torque amplifier comprising a drive shaft, a driven shaft, a pair of rotatable elements journaled coaxially with said driven shaft, means connecting said rotatable elements to said drive shaft for rotation thereby, a member journaled coaxially with said driven shaft between said elements, a pair of coil springs surrounding said driven shaft and fitting in said respective elements with slight clearance, each of said springs having one end anchored to said driven shaft and the other end frictionally connected to said member, said springs being mounted to be respectively wound and unwound on rotation of said member in a given direction, a variable speed device, means for driving the input of said variable speed drive by and in response to operation of said driving shaft, and means drivingly connecting the output side of said variable speed device to rotate said member.

5. A torque amplifier comprising drive and driven shafts, a pair of gear journaled coaxially of said driven shaft and geared to said drive shaft, a member coaxial with said driven shaft between said gears, a pair of coil springs surrounding said driven shaft and loosely received in said gears respectively, each of said springs having one end anchored to said driven shaft and the other end frictionally connected to said member, said springs being mounted to be respectively wound and unwound on rotation of said member in a given direction, a variable speed device, means for driving the input of said variable speed device, means connecting the output of said variable speed device to said member.

6. A torque amplifier comprising, a drive shaft, a driven shaft, an element journaled for rotation coaxially with and about said driven shaft, means connecting said element to be driven by said drive shaft, a member mounted coaxial with said driven shaft, a coil spring surrounding said driven shaft and received with small clearance in said element, said spring having one end anchored to said driven shaft and its other end frictionally connected to said member, a first friction disk, a splined shaft, gearing between said splined shaft and said member, a sleeve slidably mounted on said splined shaft, a second disk fixed to said sleeve and frictionally engaging and radially movable over said first disk, and means rotating said first disk by and in response to rotation of said drive shaft.

7. A torque amplifier comprising a drive shaft, a driven shaft, a rotatable element mounted coaxial with said driven shaft, means connecting said rotatable element to be rotated by said drive shaft, a member journaled concentric with said driven shaft, a coil spring surrounding said driven shaft and received with small clearance in said element, said spring having one end anchored to said driven shaft and the other end frictionally connected to said member, a first friction disk, means connecting said friction disk to be driven by said element, a splined shaft, drive means connecting said splined shaft and member to rotate the member on rotation of said splined shaft, a sleeve slidably mounted on said splined shaft, and a second disk fixed to said sleeve and frictionally engaging said first disk.

8. A torque amplifier, comprising, a drive shaft, a driven shaft, a pair of elements journaled for rotation coaxially with and about said driven shaft, means operable to oppositely rotate said elements by and proportional to rotation of said drive shaft, a member journaled for rotation coaxial with said driven shaft between said elements, a pair of coil springs surrounding said driven shaft, each being received with small clearance in a respective one of said elements, each of said springs having one end fixed to said driven shaft and its other end frictionally connected to said member, said springs being mounted to be respectively wound and unwound in response to rotation of said member in a given direction, a friction disk, a driving connection between said drive shaft and disk, a splined shaft, means rotating said member by and in response to rotation of said splined shaft, a sleeve slidably mounted on said splined shaft, a second disk fixed to said sleeve concentric of said shaft and movable radially of and in driven contact with said first disk.

9. A torque amplifier comprising a drive shaft, a driven shaft, a pair of elements mounted for rotation coaxially with said driven shaft, means rotating said elements in opposite directions by and in response to rotation of said drive shaft, a member mounted for rotation coaxially of said driven shaft, between said elements, a pair of coil springs surrounding said driven shaft each being received with slight clearance in a respective one of said elements, each spring having one end anchored to said driven shaft and its other end frictionally connected with said member, said springs being mounted to be respectively wound and unwound on rotation of said member in a given direction, a first gear formed on said member coaxial of said driven shaft, a variable speed device having its input connected to be driven by one of said elements and having an output gear in mesh with said first gear to drive the same.

10. A torque amplifier comprising a constant speed input shaft, a variable speed output shaft, an input gear on said input shaft, oppositely rotating drive gears surrounding the output shaft, helical springs between said output shaft and said drive gears, a control member frictionally engaging said springs, said springs being disposed to connect said drive gears and said output shaft on being wound or unwound by said control member, and light duty, variable speed, reversible driving means for driving said control member in either direction, and power means for driving said variable speed driving means.

11. In a torque amplifier, an input means, an output shaft, an element and a member independently journaled coaxial with said shaft, a coil spring surrounding said shaft and being received with small clearance in said element, said spring having one end anchored to said shaft and a second end frictionally engaging said member, and a variable speed device interposed between said input means and said member to drive the latter at a selected speed ratio by and in response to operation of said input means.

12. In a torque amplifier, an input means, an output shaft, an element independently journaled coaxial with said shaft, a coil spring closely surrounding said shaft between said shaft and element and normally having a small clearance with said element, said spring being anchored at one end to said shaft, and variable speed means driven by said input means to impositively drive the other end of said spring to cause the same to expand within and clutch said element to thereby form a driving connection between said input means and shaft.

WILLARD E. SWIFT, JR.